(12) United States Patent
Hyun et al.

(10) Patent No.: US 10,382,355 B2
(45) Date of Patent: Aug. 13, 2019

(54) OVERLAY MANAGEMENT SERVER AND OPERATING METHOD THEREOF

(71) Applicant: Electronics and Telecommunications Research Institute, Daejeon (KR)

(72) Inventors: Wook Hyun, Daejeon (KR); Sung Hei Kim, Daejeon (KR); Juyoung Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 120 days.

(21) Appl. No.: 15/600,976

(22) Filed: May 22, 2017

(65) Prior Publication Data

US 2017/0353398 A1    Dec. 7, 2017

(30) Foreign Application Priority Data

Jun. 2, 2016   (KR) .................. 10-2016-0068769
Apr. 10, 2017  (KR) .................. 10-2017-0045915

(51) Int. Cl.
*G06F 15/173*   (2006.01)
*G06F 15/16*    (2006.01)
*H04L 12/927*   (2013.01)
*H04L 29/08*    (2006.01)
*H04L 12/911*   (2013.01)

(52) U.S. Cl.
CPC .......... *H04L 47/805* (2013.01); *H04L 47/781* (2013.01); *H04L 67/104* (2013.01); *H04L 67/108* (2013.01); *H04L 67/16* (2013.01)

(58) Field of Classification Search
USPC ................................... 709/204, 226
See application file for complete search history.

(56) References Cited

U.S. PATENT DOCUMENTS

| 7,668,910 | B2 * | 2/2010 | Dinges ............. H04L 29/06 709/204 |
| 7,782,866 | B1 * | 8/2010 | Walsh ............... H04L 63/104 370/395.31 |
| 7,986,637 | B2 | 7/2011 | Panwar et al. |
| 8,146,133 | B2 | 3/2012 | Moon et al. |
| 9,344,495 | B2 | 5/2016 | Hyun et al. |
| 2007/0016655 | A1 | 1/2007 | Goodman et al. |

(Continued)

FOREIGN PATENT DOCUMENTS

KR   10-2008-0079935   9/2008
KR   10-2014-0008065   1/2014

*Primary Examiner* — Hee Soo Kim
(74) *Attorney, Agent, or Firm* — Kile Park Reed & Houtteman PLLC (57) ABSTRACT

An operating method of an overlay management server (OMS) is disclosed. The operating method may include performing a registration process along with a network entity, performing a resource reservation process along with the network entity in response to the registration process being performed, receiving a peer list provision request from the network entity in response to the resource reservation process being performed, and transmitting, to the network entity, a peer list including information associated with an overlay resource for the network entity based on a priority level of the network entity in response to the peer list provision request being received.

14 Claims, 8 Drawing Sheets

(56) References Cited

U.S. PATENT DOCUMENTS

| | | |
|---|---|---|
| 2008/0080392 A1 | 4/2008 | Walsh et al. |
| 2008/0133727 A1* | 6/2008 | Belqasmi ............. H04L 41/022 709/223 |
| 2009/0100128 A1 | 4/2009 | Czechowski, III et al. |
| 2009/0119455 A1 | 5/2009 | Kisel et al. |
| 2010/0064008 A1* | 3/2010 | Yan ......................... H04L 45/64 709/204 |
| 2011/0219137 A1 | 9/2011 | Yang et al. |
| 2014/0019543 A1* | 1/2014 | Hyun ................... H04L 67/104 709/204 |
| 2014/0140296 A1 | 5/2014 | Choi et al. |
| 2015/0120952 A1* | 4/2015 | Roverso ................ H04L 65/60 709/231 |

* cited by examiner

OVERLAY MANAGEMENT SERVER AND OPERATING METHOD THEREOF

CROSS-REFERENCE TO RELATED APPLICATIONS

This application claims the priority benefit of Korean Patent Application No. 10-2016-0068769 filed on Jun. 2, 2016, and Korean Patent Application No. 10-2017-0045915 filed on Apr. 10, 2017, in the Korean Intellectual Property Office, the disclosures of which are incorporated herein by reference for all purposes.

BACKGROUND

1. Field

One or more example embodiments relate to an overlay management server (OMS).

2. Description of Related Art

A peer-to-peer (P2P) network refers to a distributed network in which peers are directly connected, and a peer transmits and receives contents to and from another peer that is not a server. Thus, a peer may be a client that receives contents, and also a server that provides contents. In addition, the P2P network may be established based on contents to be shared, not a specific server. Thus, in the P2P network, a peer connection and a network size may be flexible.

For example, as existing technology related to the P2P network, Korean Patent Publication No. 10-2014-0008065 entitled "Peer-to-Peer Network System with Manageability" discloses a P2P network system that may provide at least one peer with information needed to configure a P2P network using at least one of information associated with a status of the at least one peer, information associated with a status of an underlying network, or information associated with a user in a service side, allow a service provider to stably provide a service to the at least one peer, and have a management function to control the provided service.

Using such a P2P network, a streaming service may be provided. Here, a cache server (CS) may be used for a stable provision of the service. In detail, the CS may distribute data received from a source peer or another CS to enable the stable provision of the service. However, ordinary peers may dominate the source peer or the other CS ahead of the CS, and thus the CS may not receive the data from the source peer or the other CS. Thus, the data may not be desirably distributed in an overlay network.

SUMMARY

According to an aspect, there is provided an operating method of an overlay management server (OMS), the operating method including performing a registration process along with a network entity, performing a resource reservation process along with the network entity after the registration process is performed, receiving a peer list provision request from the network entity after the resource reservation process is performed, and transmitting, to the network entity, a peer list including information associated with an overlay resource for the network entity based on a priority level of the network entity in response to the peer list provision request being received.

The peer list may include at least one of information associated with a virtual peer of a cache server (CS) pushing contents or information associated with a virtual peer of a CS having a latest fragment.

The peer list may include a length value of a random string allocated to an overlay network.

In response to the priority level of the network entity being highest, the peer list may include a full length value of the random string allocated to the overlay network.

The operating method may further include not transmitting the length value of the random string allocated to the overlay network to the network entity in response to the network entity being an ordinary peer, and transmitting the full length value or a partial length value of the random string to the network entity in response to the network entity being a virtual peer of a CS.

The performing of the registration process may include registering the network entity in the OMS in response to a registration request message being received from the network entity, allocating a resource identifier to the network entity in response to the network entity being registered in the OMS, and transmitting a response message to the network entity as response to the registration request message in response to the resource identifier being allocated.

The registering of the network entity may include setting the priority level based on an activity history of the network entity or a policy of the OMS.

The performing of the resource reservation process may include requesting the network entity to initiate a virtual peer instance with a priority key used to identify the priority level.

The performing of the resource reservation process may further include transmitting a resource reservation request message to the network entity to reserve a resource of the network entity, and transmitting, to the network entity, an entire random string allocated to the overlay network or a portion of the random string based on the priority level.

According to another aspect, there is provided an OMS including a communication interface, and a processor configured to perform a registration process along with a network entity, perform a resource reservation process along with the network entity in response to the registration process being performed, receive a peer list provision request from the network entity through the communication interface in response to the resource reservation process being performed, and transmitting, to the network entity through the communication interface, a peer list including information associated with an overlay resource for the network entity based on a priority level of the network entity in response to the peer list provision request being received.

The peer list may include at least one of information associated with a virtual peer of a CS pushing contents or information associated with a virtual peer of a CS having a latest fragment.

The peer list may include a length value of a random string allocated to an overlay network.

In response to the priority level of the network entity being highest, the peer list may include a full length value of the random string allocated to the overlay network.

The processor may not transmit the length value of the random string allocated to the overlay network to the network entity in response to the network entity being an ordinary peer, and may transmit the full length value or a partial length value of the random string to the network entity through the communication interface in response to the network entity being a virtual peer of a CS.

The processor may register the network entity in the OMS in response to a registration request message being received from the network entity through the communication interface, allocate a resource identifier to the network entity in response to the network entity being registered in the OMS, and transmit a response message as a response to the registration request message to the network entity through the communication interface in response to the resource identifier being allocated.

The processor may set the priority level based on an activity history of the network entity or a policy of the OMS.

The processor may request the network entity to initiate a virtual peer instance with a priority key used to identify the priority level.

The processor may transmit a resource reservation request message to the network entity through the communication interface to reserve a resource of the network entity, and transmit an entire random string allocated to the overlay network or a portion of the random string to the network entity through the communication interface based on the priority level.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Hereinafter, some example embodiments will be described in detail with reference to the accompanying drawings.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof. Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms used herein will be briefly described as follows before the description of example embodiments.

An overlay management server (OMS) may manage a managed peer-to-peer (MP2P) network, and aid peers participating in the MP2P network. Through an interaction with an underlying network information server (UNIS), the OMS may provide an optimal peer list to establish an optimal MP2P network.

An overlay network refers to a virtual network that is run on another network. The overlay network may include a set of nodes and links among the nodes. Such links are logical, and thus may correspond to physical links of an underlying network.

A cache server (CS) refers to a dedicated server configured to cache entire contents or a portion of the contents to achieve a certain purpose in the MP2P network. The CS may have at least one virtual peer.

An overlay resource refers to a dedicated resource for the overlay network to improve stability and performance of the overlay network. The overlay resource may include at least one virtual peer of the CS and at least one relay instance of a relay server (RS).

The relay instance refers to an instance that relays traffic. The relay instance may perform a traffic relay for a specific peer behind a network address translation (NAT)/firewall (FW). All relay instances operating in the RS may be identified. Concisely, a unique identifier may be allocated to each of the relay instances.

The RS refers to a dedicated server configured to relay traffic to at least one peer behind the NAT/FW in the MP2P network, or receive traffic relayed from the at least one peer behind the NAT/FW. The RS may have at least one relay instance.

The virtual peer refers to an instance operating as a peer that is run in the CS. The virtual peer operating as the peer may participate in at least one overlay network, and exchange a fragment with other peers. Here, the fragment refers to a portion of contents. The virtual peer operating in the CS may be identified. Concisely, a unique identifier may be allocated to the virtual peer.

Figure 1:
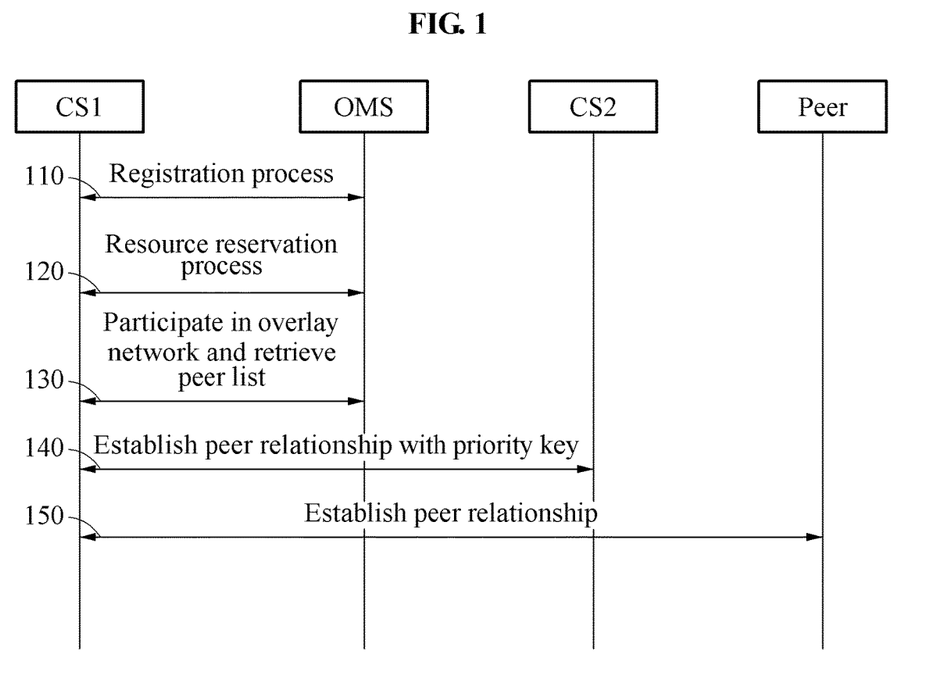
FIG. 1 is a diagram illustrating an example of a flow of operations performed in a managed peer-to-peer (MP2P) system according to an example embodiment.

FIG. 1 is a diagram illustrating an example of a flow of operations performed in an MP2P system according to an example embodiment.

An MP2P system may include various types of network entities. For example, as illustrated in FIG. 1, the MP2P system may include a plurality of CSs, and an OMS and a peer. Hereinafter, operations performed by the network entities included in the MP2P system will be described in detail.

Referring to FIG. 1, in operation 110, the OMS performs a registration process along with CS1.

In detail, in operation 110, the OMS sets a priority level of CS1. For example, the OMS may internally set the priority level of CS1 based on an activity history of CS1 and a predefined policy of the OMS. Here, in a case that CS1 is provided by a trustable service provider, CS1 may have the priority level higher than a CS provided by a voluntary user. That is, when CS1 is positioned in a domain of the service provider, the priority level of CS1 may be higher than that of the CS provided by the user. An overlay resource provided by the user and an overlay resource provided by the service provider may be different in terms of reliability or trustworthiness, and thus the OMS may assign different priority levels to the overlay resources and set different priority key lengths. The registration process will be described in greater detail with reference to FIG. 2.

In operation 120, the OMS performs a resource reservation process along with CS1.

In detail, in operation 120, the OMS requests CS1 to initiate a virtual peer instance with a priority key used to identify the priority level of CS1. When a virtual peer is successfully generated in CS1, CS1 may transmit a response message to the OMS. The resource reservation process will be described in greater detail with reference to FIG. 3.

In operation 130, CS1 participates in an overlay network and retrieves a peer list from the OMS. That is, CS1 may transmit a peer list provision request to the OMS to request the OMS to provide the peer list, and the OMS may transmit the peer list to CS1 in response to the peer list provision request.

In one example, the peer list may include information associated with an overlay resource for CS1. The information associated with the overlay resource for CS1 may include information associated with a virtual peer of a CS pushing contents or information associated with a virtual peer of a CS having a latest fragment. For example, the information associated with the overlay resource for CS1 may include information associated with at least one virtual peer of at least one CS that pushes contents toward CS1. In a case of a multimedia streaming service, the information associated with the overlay resource for CS1 may include information associated with at least one virtual peer of a CS having a latest fragment.

In addition, the peer list may include a length of a priority key possessed by a CS having the overlay resource for CS1. The length of the priority key, or a length of a random string, may depend on a priority level of a CS receiving the peer list. That is, the length of the priority key may be determined based on the priority level of the CS receiving the peer list. In the example illustrated in FIG. 1, in response to the priority level of CS1 being highest, a full length of the priority key of the CS in the overlay network may be included in the peer list. Conversely, in response to the priority level of CS1 being low, a partial length of the priority key of the CS in the overlay network may be included in the peer list. For example, under the assumption that CS2 has the overlay resource for CS1 in the overlay network, a full length of a priority key possessed by CS2 may be included in the peer list in response to the priority level of CS1 being highest, and a partial length of the priority key possessed by CS2 may be included in the peer list in response to the priority level of CS1 being low.

When CS1 receives the peer list from the OMS, the virtual peer of CS1 may establish a peer relationship with a virtual peer in the peer list. As illustrated in FIG. 1, in operation 140, the virtual peer of CS1 and a virtual peer of CS2 establish a peer relationship with the priority key of CS1. That is, the virtual peer of CS1 may transmit, to CS2, a request message including the entire priority key of CS1 or a portion the priority key of CS1. The establishing of such a peer relationship between CSs will be described in greater detail with reference to FIG. 5.

In operation 150, CS1 establishes a peer relationship with the peer. Here, in a case that the peer is an ordinary peer that does not have a priority level or priority information, CS1 may not include the priority key of CS1 in the request message. The establishing of such a peer relationship between a CS and a peer will be described in greater detail with reference to FIG. 5.

Under the assumption that CS2 is connected to the peer and CS2 has no idle or available resource currently, CS2 may release the connection to the peer to transmit data preferentially to CS1 when CS2 receives the request message from CS1. Thus, CS1 may receive the data from CS2 in preference to the peer, and CS1 configured to distribute the data may distribute the data more rapidly. Thus, distribution performance of the overlay network may be improved.

Figure 2:
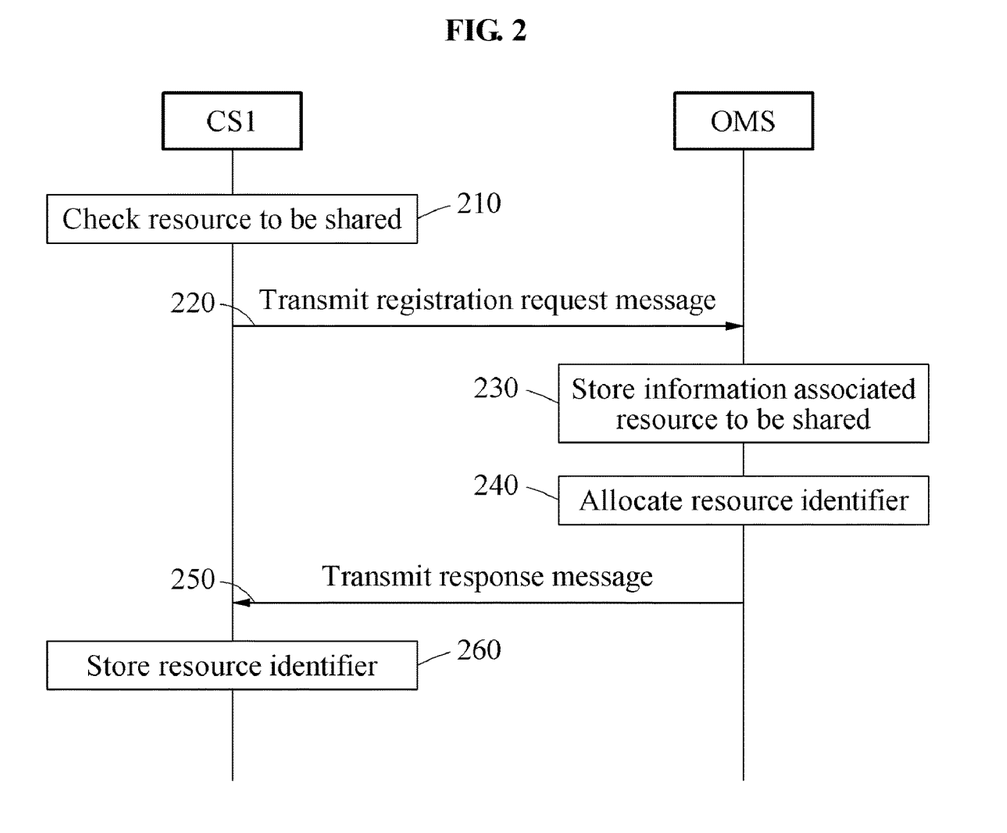
FIG. 2 is a diagram illustrating an example of a registration process according to an example embodiment.

FIG. 2 is a diagram illustrating an example of a registration process according to an example embodiment.

Referring to FIG. 2, in operation 210, CS1 checks or verifies a resource to be shared with an OMS.

In operation 220, CS1 transmits a registration request message to the OMS. The registration request message may include information associated with the resource to be shared. The information associated with the resource to be shared may include, for example, a maximum uplink bandwidth and a maximum downlink bandwidth.

In operation 230, the OMS stores the information associated with the resource to be shared, which is received from CS1. Thus, the OMS registers CS1 in the OMS. In one example, in operation 230, the OMS may set a priority level of CS1 based on an activity history of CS1 or a predefined policy of the OMS. For example, in a case that CS1 is provided by a trustable service provider, the OMS may assign a relatively high priority level to CS1. In a case that CS1 is provided by a general user, the OMS may assign a relatively low priority level to CS1.

In operation 240, when the OMS registers CS1, the OMS allocates a resource identifier to CS1.

In operation 250, when the OMS allocates the resource identifier to CS1, the OMS transmits a response message to CS1. The response message may include the resource identifier of CS1.

In operation 260, CS1 stores the resource identifier.

In one example, the OMS may request CS1 to reserve a resource based on a resource allocation request from a peer or a determination that a resource is needed. Hereinafter, a more detailed description will be provided with reference to FIG. 3.

Figure 3:
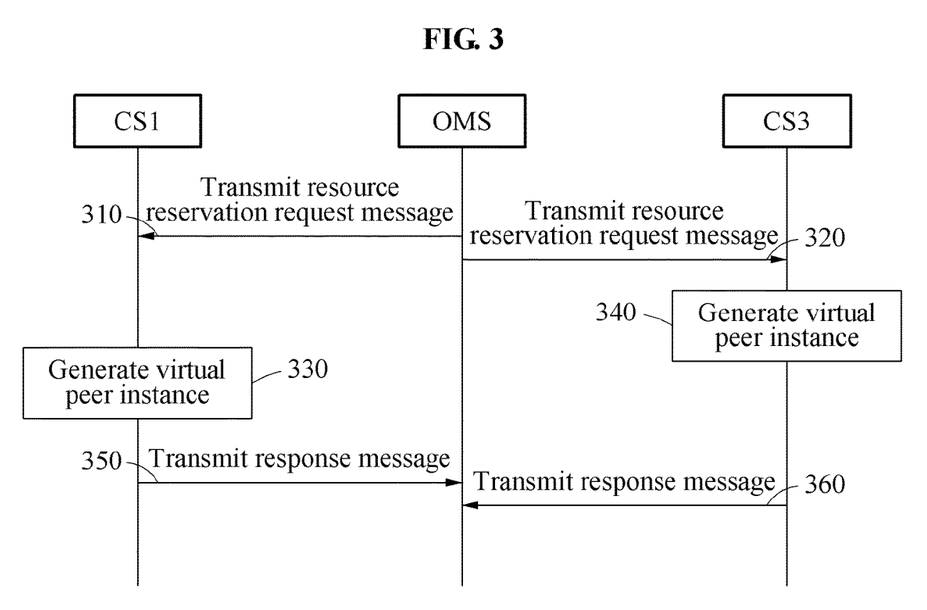
FIG. 3 is a diagram illustrating an example of a resource reservation process according to an example embodiment.

FIG. 3 is a diagram illustrating an example of a resource reservation process according to an example embodiment.

Referring to FIG. 3, in operation 310, an OMS transmits a resource reservation request message to CS1. The resource reservation request message may include a full string or a partial string of a priority key used in an overlay network. For example, under the assumption that the full string of the priority key is "aaabacdefsgadfg," the resource reservation request message may include the full string of the priority key "aaabacdefsgadfg" in response to a priority level of CS1 being highest, and the resource reservation request message may include the partial string of the priority key, for example, "aaabacd," in response to the priority level of CS1 not being relatively high. Here, a length of the partial string "aaabacd" may be associated with the priority level of CS1.

That is, in operation 310, the OMS may request CS1 to initiate a virtual peer instance with the priority key used to identify the priority level of CS1.

In operation 330, CS1 generates the virtual peer instance. In addition, CS1 generates an identifier of a virtual peer, or a virtual peer identifier (VPID), and allocates the VPID to the virtual peer.

In operation 350, CS1 transmits, to the OMS, a response message in response to the resource reservation request message. Here, the response message may include the VPID of the virtual peer of CS1.

In operation 320, the OMS transmits a resource reservation request message to another CS, for example, CS3. Here, the resource reservation request message may include a full string or a partial string of a priority key. In operation 340, when the resource reservation request message is received, CS3 generates a virtual peer instance, and allocates a VPID to a virtual peer. In operation 360, CS3 transmits, to the OMS, a response message including the VPID of the virtual peer of CS3.

In one example, CS1 may distribute data, for example, streaming data. In such an example, to improve distribution performance of the overlay network, CS1 or the virtual peer of CS1 may secure the data ahead of ordinary peers. To secure the data, CS1 may need to establish a peer relationship with a source peer or another CS. To establish such a peer relationship, CS1 may need a peer list including information of the source peer or other CSs. Here, the information of the source peer or the other CSs may be at least one of information associated with a virtual peer of a CS pushing contents, or information associated with a virtual peer of a CS having a latest fragment, which are described with reference to FIG. 1. Thus, for CS1 to secure the data, the peer list may be needed. Hereinafter, how CS1 secures such a peer list will be described in greater detail with reference to FIG. 4.

Figure 4:
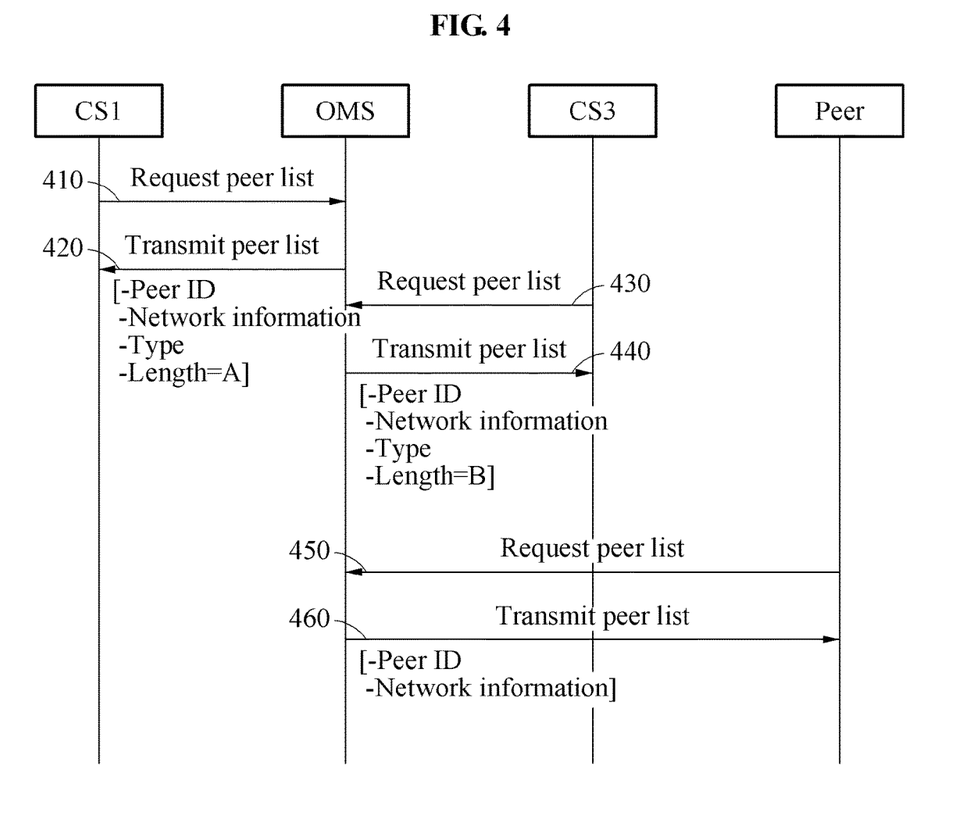
FIG. 4 is a diagram illustrating an example of a flow of operations of transmitting and receiving a peer list according to an example embodiment.

FIG. 4 is a diagram illustrating an example of a flow of operations of transmitting and receiving a peer list according to an example embodiment.

Referring to FIG. 4, in operation 410, CS1 requests an OMS to provide a peer list. When CS1 requests the OMS to provide the peer list, CS1 may transmit a VPID of a virtual peer of CS1 to the OMS. That is, CS1 may request the OMS to provide the peer list using the VPID of the virtual peer of CS1.

The OMS may figure out or verify a priority level of CS1. For example, the OMS may verify the priority level of CS1 using the VPID of the virtual peer of CS1.

In operation 420, the OMS transmits the peer list to CS1. The peer list may include at least one of information associated with a virtual peer of a CS pushing contents or information associated with a virtual peer of a CS having a latest fragment. In detail, the peer list may include at least one of an identifier of a peer, for example, a peer ID, network information, a type, or a length of a priority key. The network information may include Internet protocol (IP) address and/or port information, and the type may be set to be an ordinary peer, an RS, or a CS. The length of the priority key may be, for example, a length determined based on the priority level of CS1. In the example illustrated in FIG. 4, under the assumption that CS2 is a CS pushing contents toward CS1 or a CS having a latest fragment, a full length of the priority key is A, and CS1 has a highest priority level, the peer list may include a VPID of CS2, network information, a type corresponding to CS (type=CS), and a length of a priority key corresponding to A (length of priority key=A).

When CS1 receives the peer list, CS1 may set a peer connection to another CS or a peer based on the peer list. As described above, CS1 and CS2 may set a peer connection to each other. The setting of such a peer connection will be described in greater detail with reference to FIG. 5.

In operation 430, another network entity, for example, CS3, requests the OMS to provide a peer list. When requesting the OMS to provide the peer list, CS3 may transmit a VPID of a virtual peer of CS3 to the OMS.

The OMS may figure out or verify a priority level of CS3.

In operation 440, the OMS transmits the peer list to CS3. For example, under the assumption that CS2 is a CS pushing contents toward CS3 or a CS having a latest fragment, a full length of a priority key is A, and the priority level of CS3 is lower than the priority level of CS1, the peer list may include the VPID of CS2, network information, a type corresponding to CS (type=CS), and a length of a priority key corresponding to B (length of priority key=B). Here, a value of B is less than a value of A. That is, CS3 has the priority level lower than the priority level of CS1, and thus the peer list to be transmitted to CS3 may include a partial length value of the priority key, in lieu of a full length value of the priority key.

In operation 450, another network entity, for example, a peer, requests the OMS to provide a peer list.

The OMS may determine whether the peer corresponds to an ordinary peer or a virtual peer. For example, the OMS may determine whether the peer corresponds to the ordinary peer or the virtual peer based on an identifier of the peer. In the example illustrated in FIG. 4, under the assumption that the peer is an ordinary peer, the OMS transmits, to the peer, the peer list including the identifier of the peer and network information in operation 460. A peer list to be transmitted to an ordinary peer may not include a type and a length of a priority key, which are included in a peer list to be transmitted to a virtual peer. That is, the OMS may provide an ordinary peer with a differentiated peer list that does not include a type and a length of a priority key.

As described with reference to FIG. 4, a type of information to be included in a peer list may vary based on whether a network entity requesting the peer list is a CS or an ordinary peer.

In addition, in a case that the network entity requesting the peer list is a CS, the type of the information to be included in the peer list may vary based on a priority level of the CS.

As described above, a length of a priority key included in a peer list to be transmitted to a CS having a relatively higher priority level may be greater than a length of a priority key included in a peer list to be transmitted to a CS having a relatively lower priority level. In addition, the peer list to be transmitted to the CS having the higher priority level may include information of all CSs, and the peer list to be transmitted to the CS having the lower priority level may include information of a portion of the CSs or information of a single CS.

Hereinafter, establishing a peer relationship will be described in detail with reference to FIG. 5.

Figure 5:
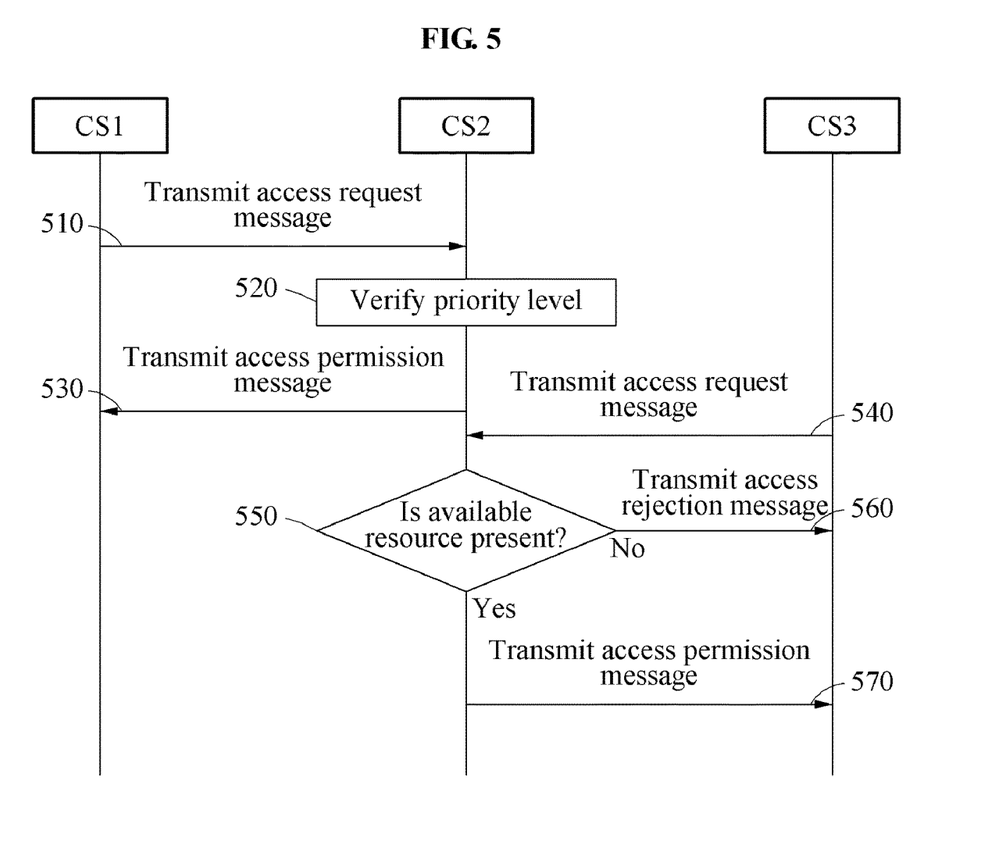
FIG. 5 is a diagram illustrating an example of a flow of operations of establishing a peer relationship according to an example embodiment.

FIG. 5 is a diagram illustrating an example of a flow of operations of establishing a peer relationship according to an example embodiment.

Referring to FIG. 5, in operation 510, CS1 transmits an access request message to CS2. For example, CS1 may select a virtual peer of CS2 from a peer list received from an OMS. As described above with reference to FIG. 4, the peer list may include a length, for example, a length of a priority key, and CS1 may generate a temporary VPID of a virtual peer of CS1 based on a priority key possessed by CS1, and the length included in the peer list. The generating of such a temporary VPID will be described in greater detail with reference to FIG. 6. CS1 may include the temporary VPID in the access request message. That is, the access request message may include the temporary VPID of CS1.

In operation 520, CS2 verifies a priority level of CS1. For example, CS2 may verify whether the priority key of CS1 in the temporary VPID included in the access request message is the same as a priority key possessed by CS2, and verify the priority level of CS1 based on a result of the verifying. When the two priority keys are the same, CS2 may determine that the priority level of CS1 is higher than or equal to the priority level of CS2. In addition, when a length of the priority key possessed by CS2 is greater than a length of the priority key in the temporary VPID, CS2 may determine that the priority level of CS1 is less than the priority level of CS2.

In operation 530, when CS2 determines that CS1 has a right to access CS2 based on the priority level of CS1, or when CS2 has an idle or available resource although CS1 has not the right, CS2 transmits an access permission message to CS1. In a case that CS2 determines that CS1 has the right to access CS2 although CS2 does not have the available resource, for example, in a case that the priority level of CS1 is higher than or equal to the priority level of CS2, CS2 may release a connection to an ordinary peer or a peer less having such a right, for example, a virtual peer having a low priority level, among peers to which CS2 is currently connected, and set a peer connection to CS1. That is, a priority in communication between CSs may be higher than a priority in communication between a CS and a peer.

Figure 6:
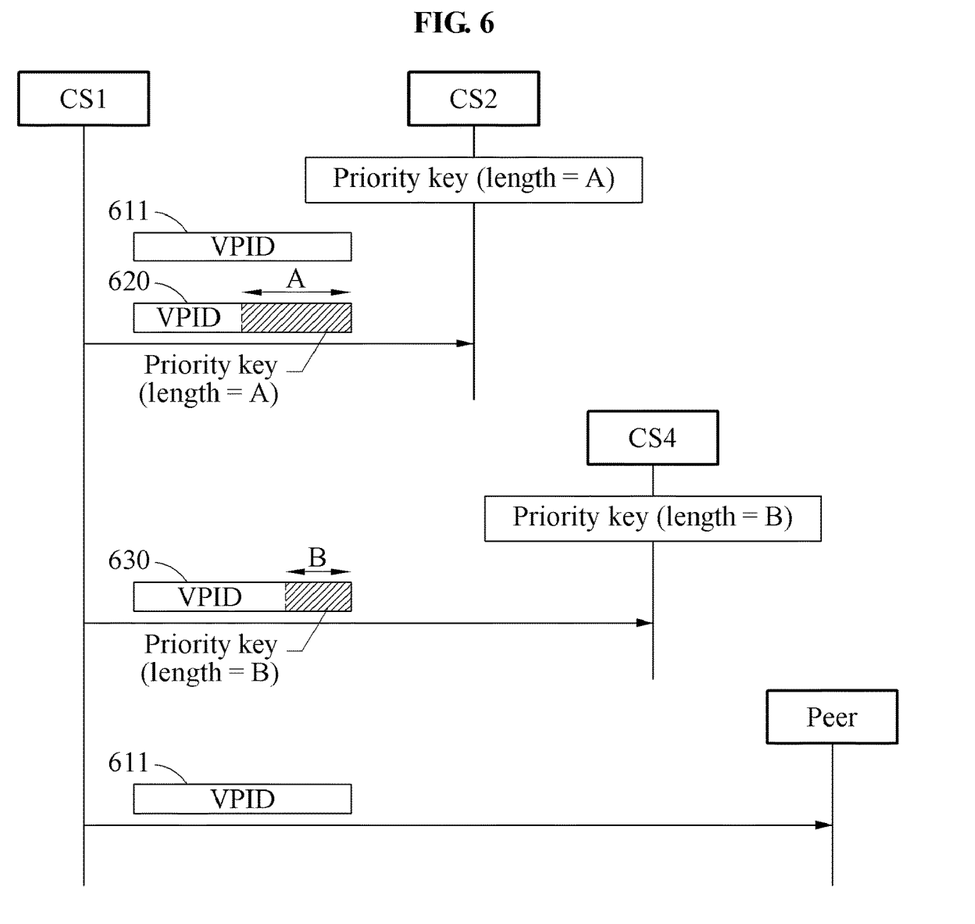
FIG. 6 is a diagram illustrating an example of a flow of operations of generating a temporary virtual peer identifier (VPID) according to an example embodiment.

In operation 540, as illustrated in FIG. 6, CS3 transmits an access request message to CS2. Here, the access request message may include a temporary VPID generated by CS3.

CS2 may verify a priority level of CS3. In the example illustrated in FIG. 5, it is assumed that a length of a priority key possessed by CS2 is longer than a length of a priority key in the temporary VPID included in the access request message of CS3, for example, the priority level of CS2 is higher than the priority level of CS3.

In operation 550, CS2 determines whether CS2 has an idle or available resource.

In operation 560, in response to a determination that CS2 has not the available resource, CS2 transmits an access rejection message to CS3.

In operation 570, in response to a determination that CS2 has the available resource, CS2 transmits an access permission message to CS3. CS2 sets a peer connection to CS3, and transmits data to CS3. However, in a case that CS2 receives an access request message from a CS having a higher priority level and CS2 has not an available resource, CS2 may release the peer connection to CS3.

FIG. 6 is a diagram illustrating an example of a flow of operations of generating a temporary VPID according to an example embodiment.

In the example illustrated in FIG. 6, it is assumed that CS2 has a priority key with a length of A (length=A), and CS4 has a priority key with a length of B (length=B).

CS1 may verify that CS2 has the length A of an entire priority key allocated to an overlay network and CS4 has the length B of the entire priority key. As described above, a peer list may include the length A of the priority key of CS2 and the length B of the priority key of CS4, and thus CS1 may verify the length of the priority key possessed by each of CS2 and CS4.

CS1 may overlap a priority key possessed by CS1 in a VPID 611 of a virtual peer of CS1, and overlap the priority key in the VPID 611 by the length A. That is, CS1 may cut the priority key of CS1 by the length A and embed, in the VPID 611, a cut priority key that is a portion of the priority key of CS1 corresponding to the length A. Thus, a temporary VPID 620 may be generated as illustrated in FIG. 6. CS1 may transmit, to CS2, an access request message including the temporary VPID 620. That is, the access request message to be transmitted to CS2 may include a full length or a partial length of the length A of the priority key of CS1.

In addition, CS1 may transmit an access request message to CS4 having a priority level lower than a priority level of CS1. Here, CS1 may overlap the priority key possessed by CS1 in the VPID 611 of the virtual peer of CS1, and overlap the priority key in the VPID 611 by the length B of a full length of the priority key possessed by CS1. Thus, a temporary VPID 630 may be generated as illustrated in FIG. 6. CS1 may transmit the access request message including the temporary VPID 630 to CS4. That is, the access request message to be transmitted to CS4 may include a full length or a partial length of the priority key of CS1.

Further, CS1 may transmit an access request message to an ordinary peer. Here, the access request message may include a VPID generated in CS1. That is, CS1 may not include the priority key of CS1 in the access request message to be transmitted to the ordinary peer. The ordinary peer may have a relatively low reliability, and thus the priority key of CS1 may be leaked when the priority key of CS1 is transmitted to the ordinary peer. However, in the example illustrated in FIG. 6, the priority key of CS1 may not be exposed to the ordinary peer, and thus not be leaked.

Figure 7:
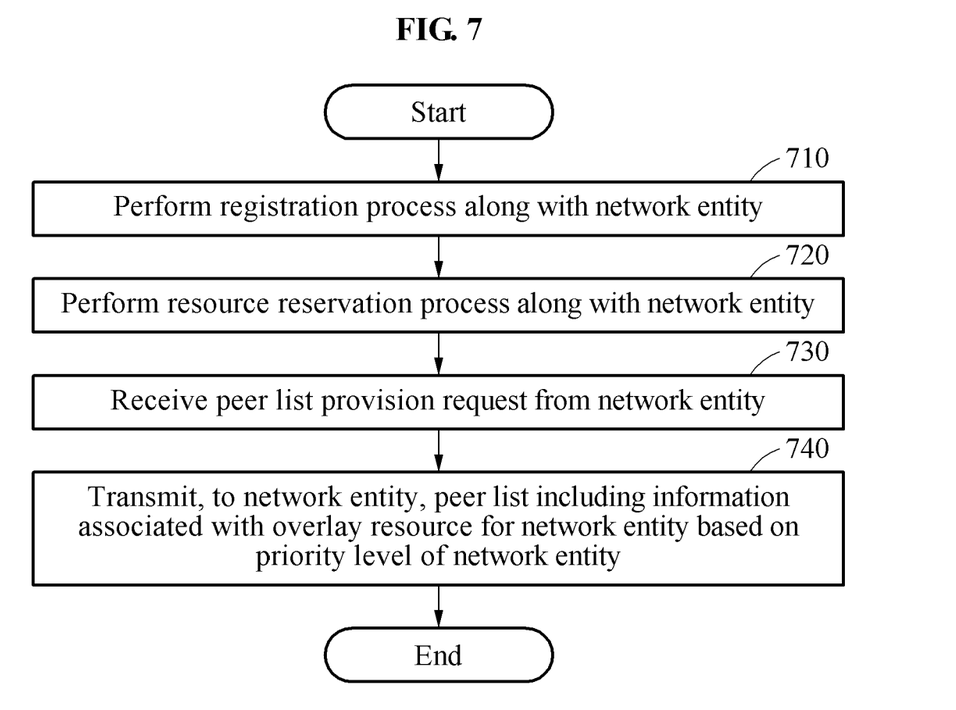
FIG. 7 is a flowchart illustrating an example of an operating method of an overlay management server (OMS) according to an example embodiment.

FIG. 7 is a flowchart illustrating an example of an operating method of an OMS according to an example embodiment.

Referring to FIG. 7, in operation 710, an OMS performs a registration process along with a network entity. The network entity may include, for example, at least one of an ordinary peer, a CS, a virtual peer of the CS, or an RS. For example, when the OMS receives a registration request message from a CS, the OMS may determine a priority level of the CS and register the CS in the OMS. When the CS is registered in the OMS, the OMS may allocate a resource identifier to the CS. When the resource identifier is allocated, the OMS may transmit a response message to the CS in response to the registration request message. Here, the response message may include the resource identifier.

In operation 720, after the registration process is performed, the OMS performs a resource reservation process along with the network entity. In a case that a resource allocation is needed, the OMS may transmit a resource reservation request message to the CS to reserve a resource of the CS. Here, the OMS may transmit, to the CS, an entire priority key or a portion of the priority key based on a priority level of the CS. For example, in response to the priority level of the CS being highest, the OMS may transmit the entire priority key to the CS.

In operation 730, after the resource reservation process is performed, the OMS receives a peer list provision request from the network entity.

In operation 740, the OMS transmits, to the network entity, a peer list including information associated with an overlay resource for the network entity based on the priority level of the network entity.

In one example, based on a type of the network entity, the peer list may include or not include a length value of the priority key, or a random string, that is allocated to the overlay network. For example, in a case of the network entity being an ordinary peer, the peer list may not include a length value of a priority key possessed by at least one CS in the overly network. In a case of the network entity being a CS or a virtual peer of the CS, the peer list may include the length value of the priority key possessed by the at least one CS. Here, the length value to be included in the peer list may vary based on a priority level of the CS. In response to the priority level of the CS being highest, the peer list may include a full length value of the priority key possessed by the CS. In response to the priority level of the CS being relatively low, the peer list may include a partial length value of the priority key possessed by the CS.

The descriptions provided with reference to FIGS. 1 through 6 may be applicable to the operations described with reference to FIG. 7, and thus a more detailed and repeated description will be omitted here for brevity.

Figure 8:
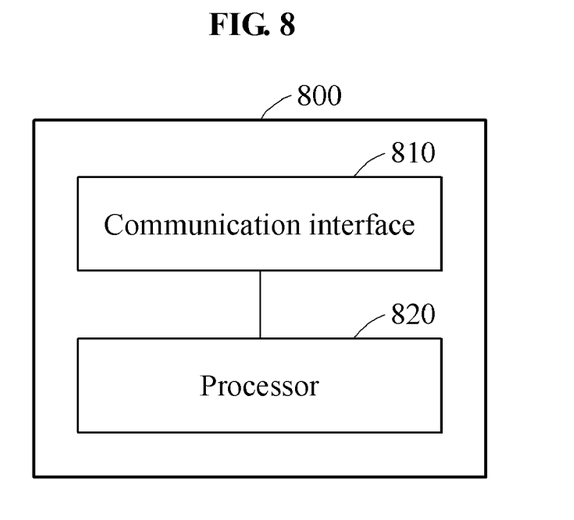
FIG. 8 is a diagram illustrating an example of an OMS according to an example embodiment.

FIG. 8 is a diagram illustrating an example of an OMS according to an example embodiment.

Referring to FIG. 8, an OMS 800 includes a communication interface 810 and a processor 820.

The communication interface 820 may communicate with at least one network entity.

The processor 820 may perform a registration process along with a network entity, and perform a resource reservation process along with the network entity after performing the registration process.

After performing the resource reservation process, the processor 820 may receive a peer list provision request from the network entity through the communication interface 810.

In response to the peer list provision request being received, the processor 820 may transmit, to the network entity through the communication interface 810, a peer list including information associated with an overlay resource for the network entity based on a priority level of the network entity.

The descriptions provided with reference to FIGS. 1 through 6 may be applicable to the OMS 800 described with reference to FIG. 8, and thus a more detailed and repeated description will be omitted here for brevity.

In a P2P system, in a case that a terminal, for example, a source peer, that provides a broadcast, is positioned behind a firewall or a network address translation (NAT), providing contents may not be easy because other peers may not access the source peer. In addition, a mobile terminal having an insufficient computational ability, a power-related issue, or a network cost-related issue may not perform a function as the source peer. To solve such challenges, a CS may perform as a virtual peer in place of the source peer. Such a CS may be provided by a network provider or a service provider, or provided voluntarily by a terminal of a general user, and may distribute data in place of the source peer. However, in a case that ordinary peers are connected to the source peer, the CS may not establish a connection to the source peer. Thus, the CS may not receive data from the source peer or another CS.

A communication channel between CSs may have a relatively higher priority compared to a communication channel between a CS and an ordinary peer. Thus, in a case that the source peer has no available resource due to the connection established between the source peer and the ordinary peers, the source peer may release a connection to a portion of the ordinary peers when the source peer receives an access request from a CS having a relatively high priority level, and establish a connection to the CS having the high priority level and transmit data preferentially to the CS having the high priority level. Thus, distribution performance of an overlay network may be improved.

The components described in example embodiments of the present disclosure may be achieved by hardware components including at least one digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An operating method of an overlay management server (OMS), the operating method comprising:
   requesting a cache server to initiate a virtual peer instance with a priority key used to identify a priority level of the cache server;
   receiving a response message from the cache server in response to a virtual peer of the cache server being created; and
   in response to a request for a peer list from the virtual peer, transmitting, to the virtual peer, a peer list including information associated with an overlay resource for the virtual peer based on the priority level, the overlay resource including another virtual peer,
   wherein the virtual peer establishes peer relationship with the another virtual peer with the priority key, and establishes peer relationship with an ordinary peer that does not have priority information without the priority key.

2. The operating method of claim 1, wherein the peer list includes a length value of a random string allocated to an overlay network.

3. The operating method of claim 1, wherein, in response to the priority level being highest, the peer list includes a full length value of a random string allocated to an overlay network.

4. The operating method of claim 1, further comprising:
   transmitting a full length value or a partial length value of a random string to the cache server.

5. The operating method of claim 1, further comprising:
   performing a registration processes along with the cache server,
   wherein the performing of the registration process comprises:
      in response to a registration request message being received from the cache server, registering the cache server in the OMS;
      in response to the cache server being registered in the OMS, allocating a resource identifier to the cache server; and
      in response to the resource identifier being allocated, transmitting a response message to the cache server in response to the registration request message.

6. The operating method of claim 5, wherein the registering of the cache server comprises:
   setting the priority level based on an activity history of the cache server or a policy of the OMS.

7. The operating method of claim 1, further comprising:
   performing a registration processes along with the cache server,
   wherein the performing of the resource reservation process further comprises:
      transmitting a resource reservation request message to the cache server to reserve a resource of the cache server; and
      transmitting, to the cache server, an entire random string allocated to an overlay network or a portion of the random string based on the priority level.

8. An overlay management server (OMS) comprising:
   a communication interface; and
   a processor configured to:
      request, through the communication interface, a cache server to initiate a virtual peer instance with a priority key used to identify a priority level of the cache server;
      receive, through the communication interface, a response message from the cache server in response to a virtual peer of the cache server being created; and
      transmit, to the virtual peer through the communication interface, a peer list including information associated with an overlay resource for the virtual peer based on the priority level in response to a request for a peer list from the virtual peer, the overlay resource including another virtual peer,
   wherein the virtual peer establishes peer relationship with the another virtual peer with the priority key, and establishes peer relationship with an ordinary peer that does not have priority information without the priority key.

9. The OMS of claim 8, wherein the peer list includes a length value of a random string allocated to an overlay network.

10. The OMS of claim 8, wherein, in response to the priority level being highest, the peer list includes a full length value of a random string allocated to an overlay network.

11. The OMS of claim 8, wherein the processor is configured to transmit a full length value or a partial length value of a random string to the cache server through the communication interface.

12. The OMS of claim 8, wherein the processor is configured to register the cache server in the OMS in response to a registration request message being received from the cache server through the communication interface, allocate a resource identifier to the cache server in response to the cache server being registered in the OMS, and transmit a response message as a response to the registration request message to the cache server through the communication interface in response to the resource identifier being allocated.

13. The OMS of claim 12, wherein the processor is configured to set the priority level based on an activity history of the cache server or a policy of the OMS.

14. The OMS of claim 8, wherein the processor is configured to transmit a resource reservation request message to the cache server through the communication interface to reserve a resource of the cache server, and transmit an entire random string allocated to an overlay network or a portion of the random string to the cache server through the communication interface based on the priority level.

* * * * *